(12) United States Patent
Van Rijnsoever

(10) Patent No.: US 6,766,451 B1
(45) Date of Patent: Jul. 20, 2004

(54) TRANSMISSION SYSTEM

(75) Inventor: Bartholomeus J. Van Rijnsoever, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/491,651

(22) Filed: Jan. 27, 2000

(30) Foreign Application Priority Data

Jan. 28, 1999 (EP) .............................................. 99200245

(51) Int. Cl.$^7$ .............................................. G06F 1/24
(52) U.S. Cl. ........................ 713/160; 713/194; 713/200; 713/201
(58) Field of Search ................................ 713/160, 194, 713/200, 201

(56) References Cited

U.S. PATENT DOCUMENTS

| | | | | |
|---|---|---|---|---|
| 5,048,087 A | * | 9/1991 | Trbovich et al. | 380/43 |
| 5,511,122 A | * | 4/1996 | Atkinson | 713/153 |
| 5,577,122 A | * | 11/1996 | Schipper et al. | 380/28 |
| 5,805,705 A | | 9/1998 | Gray et al. | 380/48 |
| 5,937,067 A | * | 8/1999 | Thatcher et al. | 380/212 |

FOREIGN PATENT DOCUMENTS

| | | |
|---|---|---|
| EP | 0702477 A2 | 3/1996 |
| WO | 9810561 | 3/1998 |

OTHER PUBLICATIONS

Thomas McGovern, "Varying Encryption Keys for a Single Call", Mar. (1995), pp. 61–62.
Draft EN 301 192 V1.1.1, European Standard, Digital Video Broadcasting (DVB); DVB Specification for data broadcasting, pp. 1–36.
RFC 1825, "Security Architecture for the Internet Protocol", Aug. 1995.

* cited by examiner

Primary Examiner—Thomas R. Peeso

(57) ABSTRACT

The transmission system according to the invention comprises a transmitter (10) and a receiver (14). The transmitter can transmit data packets, e.g. IP packets, to the receiver. These data packets comprise a header (24), e.g. an ESP header, and an encrypted data field (26). The data fields (26) can be decrypted in the receiver (14) by means of a changing decryption key (48). The header (24) comprises information (32) indicating a change of the decryption key (48). This information (32) may be included in the SPI field of an ESP header. In this way the receiver (14) can determine exactly when to start using a new decryption key (48).

20 Claims, 1 Drawing Sheet

TRANSMISSION SYSTEM

The invention relates to a transmission system for transmitting data packets from a transmitter to a receiver, said data packets comprising a header and an encrypted data field, said data fields being decryptable by means of a changing decryption key.

The invention further relates to a transmitter for transmitting data packets to a receiver, a receiver for receiving data packets from a transmitter, a method for transmitting data packets from a transmitter to a receiver and a compound signal comprising data packets.

A transmission system according to the preamble is known from the document RFC 1825,"Security Architecture for the Internet Protocol", August 1995. In many modern digital transmission systems a transmitter broadcasts data services to a plurality of receivers. In such systems it may be desirable that only a limited number of the users of the receivers, e.g. only those who have paid or who belong to a certain group, have access to the data services. Such conditional access to the data services can be realised by encrypting the data, by transmitting the encrypted data to the receivers, and by supplying only to those receivers who are entitled to the data the decryption keys necessary for the decryption of the data. By means of the decryption keys the receivers can decrypt the data. For security reasons the decryption key has to be changed after a certain period of time or after the transmission of a certain amount of data. The transition to a new decryption key has to be synchronised between transmitter and receiver.

It is unclear how the known transmission system deals with this synchronisation.

An object of the invention is to provide a transmission system, wherein the receiver is able to efficiently handle the decryption of encrypted data packets. This object is achieved in the transmission system according to the invention, which is characterized in that the header comprises information indicating a change of the decryption key. By including this information in the header the receiver can determine exactly when to start using a new decryption key.

An embodiment of the transmission system according to the invention is characterized in that the data packets comprise IP packets. In this way data services defined at the IP level can be broadcasted securely.

A further embodiment of the transmission system according to the invention is characterized in that the header comprises an ESP header, said ESP header comprising the information indicating a change of the decryption key. By including the information indicating a change of the decryption key in the SPI field of the ESP header a maximum commonality with IP encryption mechanisms used in the Internet is reached. The SPI field is the only mandatory field for all different encryption methods, so this field does not change.

The above object and features of the present invention will be more apparent from the following description of the preferred embodiments with reference to the drawing, wherein.

Figure 1:
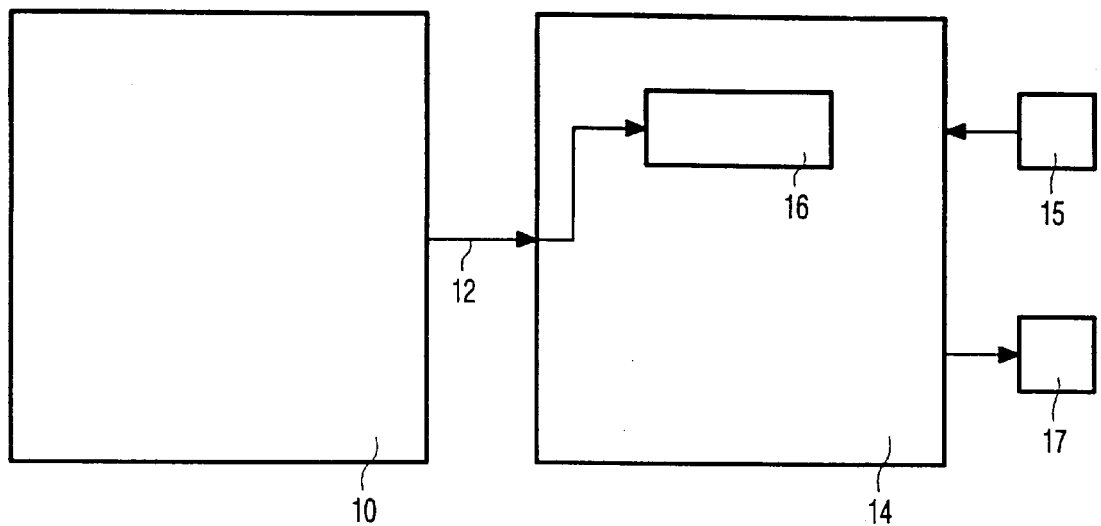
FIG. 1 shows a block diagram of a transmission system according to the invention.

FIG. 1 shows a block diagram of a transmission system according to the invention. In such a transmission system a number of data signals 12 or compound signals 12, which represent a number of data services, are transmitted by a transmitter 10 to a receiver 14. The transmission system may comprise further receivers 14. An end-user is able to control a receiver 14 by means of a input device 15, like for instance a keyboard or a remote control. Selected services can be shown on a display device 17. By means of the data signals 12 data packets, e.g. IP packets, can be broadcasted by the transmitter 10 to a plurality of receivers 14.

In such a transmission system it may be desirable that only a limited number of the users of the receivers 14, e.g. only those who have paid or who belong to a certain group, have access to the data services. Such conditional access to the data services can be realised by encrypting the data in the transmitter 10 and by transmitting the encrypted data to the receivers 14. Furthermore, the decryption keys necessary for the decryption of the data are encrypted themselves and only those receivers 14 who are entitled to the data are able to decrypt the decryption keys. By means of the decryption keys the receivers 14 can then decrypt the data. The decryption keys may be retransmitted a number of times so that the receivers 14 are able to access the decryption keys quickly.

The transmitter 10 transfers the decryption keys to the receiver 14 in the form of so-called Entitlement Control Messages or ECMs. Such an ECM, which may be embedded in an IP packet, contains an encrypted version of a decryption key or control word. By decrypting the ECM in the receiver 14, e.g. by means of a smart card which is included in the receiver 14, the decryption key may be revealed if the receiver also holds a corresponding data service or entitlement. For the purpose of security the control word value changes often, e.g. after a certain period of time or after the transmission of a certain amount of data. A new ECM has to be transferred to the receiver, in case the control word value has changed. So with each conditionally accessible data service a stream of ECMs is associated. It may be required to retransmit an unchanged ECM several times in order to reduce to time it takes for a receiver 14 to access the service. (To access a service, the receiver 14 must first acquire the corresponding ECM.) Filter means 16 may be included in the receiver 14 for the purpose of filtering out second and further occurrences of the same decryption key.

An example of a transmission system for broadcasting data services in a computer network environment, e.g. the Internet, is known from the document RFC 1825, "Security Architecture for the Internet Protocol", August 1995. In this document two modes for the encryption of IP packets are described: Transport mode: the payload of an IP packet is encrypted. Tunnel mode: an entire IP packet is encrypted, and a new IP header is placed before the encrypted packet. This mode is for example used to encrypt virtual-private-network traffic that passes through a non-trusted network. In both modes a so-called ESP (Encapsulating Security Payload) header is included in the newly created IP packets containing the encrypted data. This ESP header starts with a 32 bit field called Security Parameter Index (SPI). Together with the destination address, the SPI defines among other things which keys to use for decryption, which decryption algorithm to use and how to apply the decryption algorithm.

A transmission system for broadcasting data services is known from the document Draft EN 301 192 V1.1.1, European Standard,"Digital Video Broadcasting (DVB); DVB specification for data broadcasting". Such a known transmission system may for example be implemented in a cable television (CATV) network environment. In this environment the transmitter 10 comprises the headend of the CATV-network and the receivers 14 comprise the set-top boxes, television sets or PCs of the end-users. The data signals 12 comprise multiplex signals 12 which can be implemented in the form of MPEG-2 transport streams. An MPEG-2 transport stream is a multiplex of a number of so-called services. Such a service can contain an audio/video stream, an interactive application (for example in the MHEG-5 format), other kinds of data (for example IP packets) or a combination of these elements. Typically, a headend 10 transmits several transport streams 12 to the set-top boxes 14. In this way, a large number of services (or channels) can be broadcast by the headend 10 to a plurality of set-top boxes 14.

A set-top box 14 can tune to a specific transport stream 12 and is then able to retrieve information from the transport stream 12. Such a set-top box 14 typically has only one tuner and is thus merely able to receive a single transport stream 12 at a time. When a user wants to look at a television program, or wants to run an interactive application, or wants to access other kinds of data the set-top box 14 tunes to the corresponding transport stream 12 and retrieves and/or processes the required data from the service as it is being broadcast at that moment.

Figure 2:
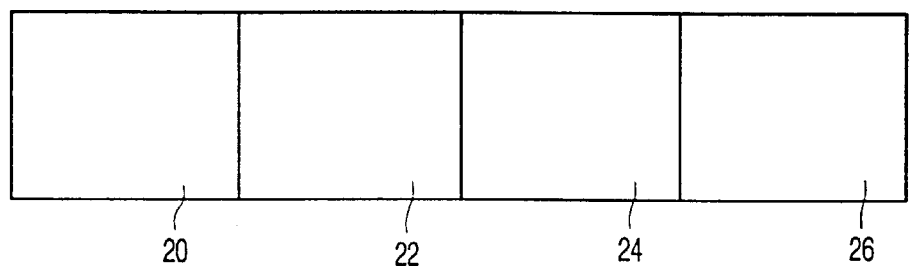
FIG. 2 shows a structure diagram of a data packet, which data packet is comprised in a section.

FIG. 2 shows a structure diagram of a data packet, which data packet is comprised in a first section. DVB has defined 6 protocol stacks for data broadcasting. One of these protocol stacks is the so-called multi-protocol encapsulation or MPE. In this case, there is a one-to-one mapping between a data packet and an MPEG section, and an MPEG section is usually transmitted in several MPEG-2 transport stream packets. The MPEG sections are of a special type as defined by the protocol layers DSM-CC private data and DVB multi protocol enapsulation. In the structure diagram shown in FIG. 2 the data packet is an IP packet which comprises an IP header 22, an ESP header 24 and an encrypted IP payload or data field 26. The data fields 26 can be decrypted by means of a changing decryption key 48. The ESP header comprises a so-called Security Parameter Index (SPI) field. An MPE section header 20 indicates that the data packet is embedded in a MPE section. The ECMs may also be embedded in a similar structure. The packet containing an ECM is referred to as a decryption packet. Preferably the decryption packets are included in a second section which is linked to the first section which contains the data packets. The first and second sections are linked together by means of at least a part of the first and second sections, which part is identical for both sections. By concentrating the encrypted data packets and the therewith associated decryption packets in sections which are linked together the receiver can easily obtain the data packets and the decryption packets needed for decrypting the data packets by using a single filter which filters out all packets containing said identical part. Preferably the identical part is included in the section headers 20. For example, the table_id and/or the MAC_address parts of the MPE section header 20 as defined in Table 3 in the document Draft EN 301 192 V1.1.1, European Standard, "Digital Video Broadcasting (DVB); DVB specification for data broadcasting") can be used for this purpose.

Figure 3:
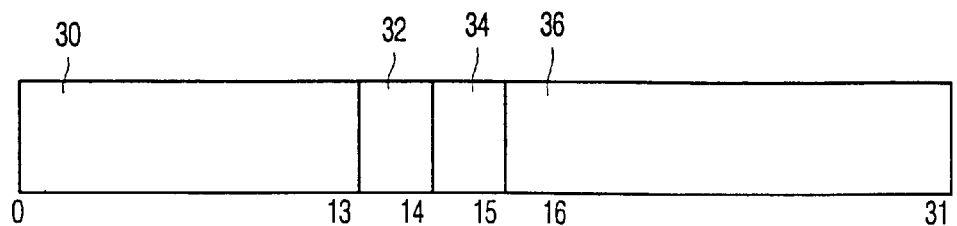
FIG. 3 shows an example of a structure diagram of a SPI field.

FIG. 3 shows an example of a structure diagram of a SPI field. This is the only mandatory field for all different IP encryption methods used in the Internet, so this field does not change. Its purpose is to identify (together with the destination address) which keys and algorithms the receiver 14 should use to decrypt the data. In this example the first 14 bits of the SPI field are used to store an ECM stream reference 30, which provides the association between the ECM stream and the encrypted data. The fifteenth bit is used to store information 32 indicating a change of the decryption key. By means of this information 32 control word changes can be synchronised in the transmission system. The synchronisation bit 32 toggles value when the control word used to encrypt the data has changed value. This allows the receiver 14 to determine exactly when to start using a new control word value. The sixteenth bit 34 of the SPI field is reserved for future use. The last sixteen bits of the SPI field are used to store an identification 36 of the conditional access system which is used by the transmission system.

The information 32 indicating a change of the decryption key may also be stored in a multi-bit counter.

It takes time for the smart card in the receiver 14 to process an ECM. So to avoid the need of extensive buffering of encrypted data, a new ECM should be transmitted some time before the corresponding control word is actually used. The receiver 14 must store the new control word, while it is still using the old control word to decrypt the data. The same ECM is normally retransmitted several times in order to reduce the service access time. To descramble a service, first an ECM has to be decoded to obtain the control word. Without transmission errors it is sufficient that ECMs contain a single control word. A more robust system is however obtained if ECMs contain two consecutive control words. If there are two or more consecutive control words in an ECM, retransmissions of the same ECM increase the probability that a control word is received in time if ECMs are possibly lost due to transmission errors.

In the MPE section header 20 a so-called payload_scrambling_control field (two bits) has been defined to indicate the change to another control word (see Table 3 in the document Draft EN 301 192 V1.1.1, European Standard, "Digital Video Broadcasting (DVB); DVB specification for data broadcasting"). For IP packets that contain data, these synchronisation bits indicate that the content is scrambled (11) or not (00). For IP packets that transfer an ECM, the bits indicate that the control word is even (01) or uneven (10). These synchronisation bits can be used by the filter means 16, which preferably is a hardware filter, to filter out multiple instances of the same ECM so that these don't have to be removed by software. If encryption is used, the filter means 16 alternates between (1x) and (x1). Initially the filter means 16 uses a filter 1x. This means that when the first control word (which is uneven) has passed the filter means 16 start using a filter x1. Second and further occurrences of the first control word are filtered out by the filter means 16. The first occurrence of the second control word (which is even) passes the filter means 16, after which the filter means 16 start using the filter 1x. Second and further occurrences of the second control word are filtered out by the filter means 16. The first occurrence of the third control word can now pass the filter means 16, and so forth.

What is claimed is:

1. A transmission system for transmitting data packets from a transmitter to a receiver, said data packets comprising a header and an encrypted data field, said data fields being decryptable by means of a changing decryption key, wherein the header comprises a synchronization bit that toggles so as to indicate exactly when a change of the decryption key is to be used by the receiver.

2. A transmission system according to claim 1, wherein the data packets comprise IP packets.

3. A transmission system according to claim 2, wherein the header comprises an ESP header, said ESP header comprising the information indicating a change of the decryption key.

4. A transmission system according to claim 3, wherein the ESP header comprises a SPI field, said SPI field comprising the synchronization bit that indicates when a change of the decryption key has occurred.

5. A transmitter for transmitting data packets to a receiver, said data packets comprising a header and an encrypted data field, said data fields being decryptable by means of a changing decryption key, wherein the header comprises a synchronization bit that toggles so as to indicate exactly when a change of the decryption key occurs.

6. A transmitter according to claim 5, wherein the data packets comprise IP packets.

7. A transmitter according to claim 6, wherein the header comprises an ESP header, said ESP header comprising the synchronization bit that indicates a change of the decryption key has occurred.

8. A transmitter according to claim 7, wherein the ESP header comprises a SPI field, said SPI field comprising the synchronization bit that toggles so as to indicate exactly when a change of the decryption key has occurred.

9. A receiver for receiving data packets from a transmitter, said data packets comprising a header and an encrypted data field, said data fields being decryptable by means of a changing decryption key, said receiver being embodied so as to decrypt the encrypted data fields, wherein the header includes a synchronization bit that indicates exactly when a change of the decryption key is to be used by the receiver.

10. A receiver according to claim 9, wherein the data packets comprise IP packets.

11. A receiver according to claim 10, wherein the header comprises an ESP header, said ESP header comprising the synchronization bit that indicates a change of the decryption key.

12. A receiver according to claim 11, wherein the ESP header comprises a SPI field, said SPI field comprising the synchronization bit that indicates a change of the decryption key.

13. A method for transmitting data packets from a transmitter to a receiver, said data packets comprising a header and an encrypted data field, said data fields being decryptable by means of a changing decryption key, wherein the method comprises the indication of a change of the decryption key in the header.

14. A method according to claim 13, wherein the data packets comprise IP packets.

15. A method according to claim 14, wherein the header comprises an ESP header, said indication of a change of the decryption key being comprised in the ESP header.

16. A method according to claim 15, wherein the ESP header comprises a SPI field, said indication of a change of the decryption key being comprised in the SPI field.

17. A compound signal comprising data packets, said data packets comprising a header and an encrypted data field, said data fields being decryptable by means of a changing decryption key, wherein the header comprises a synchronization bit that indicates a change of the decryption key.

18. A compound signal according to claim 17, wherein the data packets comprise IP packets.

19. A compound signal according to claim 18, wherein the header comprises an ESP header, said ESP header comprising the synchronization bit that indicates a change of the decryption key.

20. A compound signal (12) according to claim 19, wherein the ESP header comprises a SPI field, said SPI field comprising the synchronization bit that indicates a change of the decryption key.

* * * * *